United States Patent [19]

Baney et al.

[11] 4,275,118
[45] Jun. 23, 1981

[54] PIGMENT-FREE COATINGS WITH IMPROVED RESISTANCE TO WEATHERING

[75] Inventors: Ronald H. Baney; Frank K. Chi, both of Midland, Mich.

[73] Assignee: Dow Corning Corporation, Midland, Mich.

[21] Appl. No.: 35,353

[22] Filed: May 2, 1979

Related U.S. Application Data

[63] Continuation-in-part of Ser. No. 3,188, Jan. 15, 1979, abandoned.

[51] Int. Cl.³ .............................................. B32B 27/36
[52] U.S. Cl. ................................ 428/412; 106/287.16; 106/287.19; 252/313 S; 252/317; 427/163; 427/165; 427/387; 427/389; 427/389.9; 427/393; 427/393.5; 427/393.6; 428/35; 428/429; 428/447; 428/457; 428/500
[58] Field of Search ............... 260/37 SB; 106/287.16, 106/287.19, 299, DIG. 5, 287.1; 427/387, 163, 165, 389, 389.9, 393, 393.5, 393.6; 428/447, 35, 429, 457, 500, 538, 539, 412; 252/313 S, 317; 220/1 BC

[56] References Cited

U.S. PATENT DOCUMENTS

| | | | |
|---|---|---|---|
| 2,455,367 | 12/1948 | King | 106/287.16 |
| 2,950,986 | 8/1960 | Bailey et al. | 428/429 |
| 3,007,878 | 11/1961 | Alexander et al. | 252/313 S |
| 3,244,639 | 4/1966 | Mindick et al. | 252/313 S |
| 3,298,959 | 1/1967 | Marks et al. | 252/300 |
| 3,451,838 | 6/1969 | Burzynski et al. | 428/412 |
| 3,460,956 | 8/1969 | Dahle | 106/287.19 X |
| 3,697,642 | 10/1972 | Madigan | 424/59 |
| 3,751,326 | 8/1973 | Marks | 260/37 R X |
| 3,960,800 | 6/1976 | Kohl, Jr. | 106/287.19 X |
| 3,976,497 | 8/1976 | Clark | 260/37 SB X |
| 3,986,997 | 10/1976 | Clark | 260/29.2 M |
| 4,049,861 | 9/1977 | Nozari | 428/220 |
| 4,084,021 | 4/1978 | Sandvig | 427/387 X |
| 4,111,890 | 9/1978 | Getson et al. | 260/37 SB |
| 4,170,690 | 10/1979 | Armbruster | 106/287.16 X |

FOREIGN PATENT DOCUMENTS

1393488 5/1975 United Kingdom .
2001870 2/1979 United Kingdom .

OTHER PUBLICATIONS

Kinetics and Mechanisms of Polyreactions, International Symposium on Macromolecular Chemistry, Preprints, vol. 1, pp. 167-170 (1969).
Physics of Thin Films, Hass & Thun, Eds., vol. 5, Academic Press, pp. 87-122 (1969).
Chemical Abstracts, vol. 84, 151,558y (1976).
Cab-Orti, Data Sheet, 2575/761 (6 pages, Cabot Corp., 125 High St., Boston, Mass. 02110.
Chemical Abstracts, vol. 75, 78226w (1971).

*Primary Examiner*—Ronald H. Smith
*Assistant Examiner*—Thurman K. Page
*Attorney, Agent, or Firm*—Richard E. Rakoczy

[57] ABSTRACT

A pigment-free coating composition comprising an acidic dispersion of colloidal titania, colloidal silica and hydroxylated silsesquioxane in an alcohol-water medium. A coating of the composition cured on a plastic substrate such as polycarbonate results in a hard, abrasion-resistant protective coating. Such coatings transmit visible light, but absorb wavelengths of ultraviolet light which cause degradation of the substrate surface and resultant adhesion-loss of the protective coating upon weathering. A cured coating of these compositions deposited on metal substrates such as aluminum results in a hard, abrasion resistant coating which offers slightly more corrosion protection than such a composition without colloidal titania.

27 Claims, No Drawings

PIGMENT-FREE COATINGS WITH IMPROVED RESISTANCE TO WEATHERING

BACKGROUND OF THE INVENTION

This invention is a continuation-in-part of applicants' copending application Ser. No. 3,188, filed on Jan. 15, 1979, now abandoned.

1. Field of the Invention

This invention relates to a protective coating composition. One aspect of the invention is to provide a stable dispersion of colloidal titania, colloidal silica and hydroxylated silsesquioxane. Another aspect of this invention is to provide a hard, abrasion-resistant coating which transmits visible light, but absorbs ultraviolet radiation which is harmful to a plastic substrate. Another aspect is to provide a coating which is also useful in altering the optical properties of a substrate. Still another aspect of this invention is to provide an abrasion-resistant coating for metal substrates which also protects against corrosion.

2. Description of the Prior Art

There is a need for transparent glazing materials which exhibit a greater resistance to shattering than glass. Synthetic organic polymers can be formed into transparent enclosures and these materials, such as polycarbonates and acrylics, are finding use in glazing for autos, buses and aircraft and as windows in public buildings. While these polymers are easily fabricated into the desired shape, and are less dense and have more resistance to breakage than glass, their abrasion resistance is relatively low. This lack of surface hardness and abrasion resistance has severely restricted the use of these transparent polymeric materials. Other uses of the polymeric materials, such as glazing, decorative architectural panels and mirrors, are also limited because of this lack of abrasion resistance.

Scratch resistant coatings, such as silica-containing solutions and polysilicic acid fluorinated copolymer compositions, are available in the prior art. These materials have found only limited commercial use because they are difficult to apply, poor in humidity resistance or expensive.

H. A. Clark, in U.S. Pat. No. 3,986,997, taught the use of compositions consisting of an acidic dispersion of colloidal silica and hydroxylated silsesquioxane in an alcohol-water medium to produce an abrasion-resistant coating for such materials. However, the compositions taught by Clark are transparent to ultraviolet light having a wavelength higher than approximately 210 millimicrons. Use of polycarbonate glazing material is quite desirable due to its high impact strength and dimensional stability. However, studies have shown that ultraviolet radiation in the vicinity of 287 millimicrons causes a breakdown in carbonate linkages accompanied by liberation of carbon monoxide and carbon dioxide and depolymerization of the substrate. Ultraviolet radiation from the sun can reach the surface of a substrate coated with an ultraviolet radiation-transparent coating and cause it to degrade. As a result, the protective coating loses adhesion and begins to flake off as the article weathers. Eventually, the substrate is left unprotected.

Prior art methods for protecting plastic substrates from ultraviolet radiation-induced degradation are available. Most methods incorporate some type of ultraviolet absorbent compound into the protective coating which absorbs the harmful radiation and transforms it into some other form of energy such as heat. Examples of such coatings can be found in U.S. Pat. Nos. 2,950,986; 2,989,559; 3,451,838 and British Pat. No. 1,393,488. U.S. Pat. No. 3,298,959 teaches the use of a suspension of submicron particles such as carbon black and/or soluble ultraviolet light absorbers in selective light absorbing film forming compositions but does not suggest the use of colloidal titania as the sole ultraviolet absorber. Compositions of the present invention utilize colloidal titanium dioxide as an ultraviolet absorbing means which is easily incorporated into the composition and is not itself degraded as the coating weathers.

SUMMARY OF THE INVENTION

Cured coatings embodying the present invention show greater resistance to loss of adhesion upon weathering than coatings containing silica alone. Accelerated weathering tests conducted in an Atlas "Weather-O-Meter" ® per ASTM D-822 show that coatings containing silica alone lose adhesion after 190 hours of exposure while coatings containing a small amount of colloidal titania in addition to colloidal silica resist loss of adhesion for at least 352 hours. Thus, one object of this invention is to provide protective coatings for plastic glazing materials used in outdoor applications.

Since most ultraviolet absorbing compounds are fairly large molecules which are subject to oxidation and loss of effectiveness upon weathering, the use of a fully oxidized inorganic metal oxide to absorb harmful radiation is advantageous. Thus, another object of this invention is to provide a coating with a very low hydrocarbon content so that the coating itself consists essentially of inorganic material which is itself very resistant to the effects of weathering.

Another object of this invention is to provide a convenient means for altering the optical characteristics of the article coated such as a lens. Titanium dioxide has one of the highest refractive indices known among colorless substances. The refractive indices for anatase and rutile titanium dioxides are 2.52 and 2.76, respectively, while silica has a refractive index of 1.46 which is rather close to that of pure silica glass at 1.52. By varying the proportions of colloidal titania and silica, the refractive index of the film can be varied. This property could then be used to produce reflective and partially reflective coatings for lenses, windows, windshields and the like by using single or multiple layers with differing refractive indices. The prior art teaches the use of metal oxide coatings formed on articles such as lenses, but the techniques used to apply them, such as vacuum metallizing, are usually expensive or complicated. Furthermore, such coatings are often rather easily abraded since the metal oxide is usually deposited without a binder.

Another object of the present invention is to provide hard, relatively abrasion-resistant coatings for non-ferrous metals, such as aluminum, copper and brass, which offer more resistance to corrosion by acids than coatings containing colloidal silica alone. These and other objects of the present invention will be apparent to one skilled in the art upon consideration of the following description and appended claims.

DESCRIPTION OF THE INVENTION

The present invention is an unpigmented coating composition comprising a dispersion of colloidal silica and colloidal titania, said collidal particles having a particle size falling in the range of 5 to 150 millimicrons, in a water-alcohol solution of the partial condensate of a silanol having the formula $RSi(OH)_3$ in which R is selected from the group consisting of alkyl radicals of 1 to 3 inclusive carbon atoms, the gammachloropropyl radical, the vinyl radical, the 3,3,3-trifluoropropyl radical, the gammaglycidoxypropyl radical, the gammamethacryloxypropyl radical, the gamma-mercaptopropyl radical, and the phenyl radical, at least 70 weight percent of the silanol being $CH_3Si(OH)_3$, said composition containing 5 to 50 weight percent solids, said solids consisting essentially of 1 to 10 weight percent of said colloidal titania, 20 to 56 weight percent colloidal silica and 34 to 79 weight percent of said partial condensate, said composition containing sufficient acid to provide pH in the range of 2.0 to 6.0. The present invention also encompasses a cured coating of this composition deposited on a solid substrate.

Furthermore, the present invention is a cured coating comprising:
(a) from 1 to 10 weight percent colloidal titania, the particle size of said colloidal titania falling in the range of 5 to 150 millimicrons in diameter, and
(b) from 20 to 56 weight percent colloidal silica, the particle size of said colloidal silica falling in the range of 5 to 150 millimicrons in diameter, in a matrix of
(c) a silsesquioxane of the formula $RSiO_{3/2}$ in which R is selected from the group consisting of alkyl radicals of 1 to 3 inclusive carbon atoms, the gammachloropropyl radical, the vinyl radical, the 3,3,3-trifluoropropyl radical, the gamma-glycidoxypropyl radical, the gamma-methacryloxypropyl radical, the gammamercaptopropyl radical, and the phenyl radical, at least 70 weight percent of such silsesquioxane being $CH_3SiO_{3/2}$, said matrix comprising 34 to 79 weight percent of the cured coating.

The present invention also comprises a cured composition of the type described in this paragraph deposited on a solid substrate.

The nonvolatile solids portion of the unpigmented coating composition described in the first paragraph consists of a mixture of colloidal titania, colloidal silica and the partial condensate of a silanol. The major portion of the partial condensate or siloxanol is obtained from the condensation of $CH_3Si(OH)_3$. A minor portion of the partial condensate may be obtained from condensation with $C_2H_5Si(OH)_3$, $C_3H_7Si(OH)_3$, $CH_2=CHSi(OH)_3$, $C_6H_5Si(OH)_3$, $(CH_3)_2CHSi(OH)_3$, $F_3C-(CH_2)_2Si(OH)_3$, $Cl(CH_2)_3Si(OH)_3$, $H_2C=C(CH_3)COO(CH_2)_3Si(OH)_3$,

$HS(CH_2)_3Si(OH)_3$, or mixtures thereof. To obtain the best compromise between economy and optimum properties in the composition and cured coating, utilization of all monomethyl trisilanol in the formulation is preferred.

Preparation of the trisilanols has been described in Clark, U.S. Pat. No. 3,986,997 which is hereby incorporated by reference. As will be further described in the examples, the trisilanols are generated in situ by adding the corresponding trialkoxysilanes to acidic water-alcohol dispersions of colloidal silica, colloidal titania or mixtures of both. Suitable trialkoxysilanes are those containing methoxy, ethoxy, propoxy, and isopropoxy substituents which, upon hydrolysis, liberate the corresponding alcohol; thus, generating at least a portion of the alcohol present in the coating composition. Clark, supra, suggests the following mechanism for formation of a partial condensate. Upon generation of the silanol in the acidic aqueous medium, there is condensation of the hydroxyl substituents to form Si—O—Si bonding. The condensation is not complete, but rather the siloxane retains an appreciable quantity of silicon-bonded hydroxyl groups, thus rendering the polymer soluble in the water-alcohol cosolvent. It is believed that this soluble partial condensate can be characterized as a siloxanol polymer having at least one silicon-bonded hydroxyl group per every three —SiO— units. During curing of the coating on a substrate, these residual hydroxyls condense to give a silsesquioxane, $RSiO_{3/2}$.

As disclosed in Clark, supra, the silica component of the composition is present as colloidal silica. Aqueous colloidal silica dispersions generally have a particle size in the range of 5 to 150 millimicrons in diameter. These silica dispersions are prepared by methods well-known in the art and are commercially available under such registered trademarks as "Ludox" and "Nalcoag". It is preferred to use colloidal silica of 10–30 millimicron particle size in order to obtain dispersions having a greater stability and to provide coatings having superior optical properties. Colloidal silicas of this type are relatively free of $Na_2O$ and other alkali metal oxides, generally containing less than 2 weight percent, preferably less than 1 weight percent, $Na_2O$. They are available as both acidic and basic hydrosols. Colloidal silica is distinguished from other water dispersible forms of $SiO_2$, such as nonparticulate polysilicic acid or alkali metal silicate solutions, which are not operative in the practice of the present invention.

Several sources of colloidal titania dispersions or sols having a particle size in the range of 5 to 150 millimicrons are available. Weiser, Inorganic Colloidal Chemistry, vol. 2, p. 281 (1935) describes production of acidic titania sols by hydrolysis of titanium tetrachloride, by peptizing hydrous titanium dioxide with tartaric acid and by peptizing ammonia washed $Ti(SO_4)_2$ hydrolyzate with a small amount of hydrochloric acid. See also Matijevic, Budnik and Meites, Journal of Colloid and Interface Science 61:302–311 (1977). One difficulty with production of titania sols by these methods is the necessity for removing sulfate, chloride, and other ions formed during the production of the sols. Removal of these ions is accomplished by the use of dialysis or ion-exchange resins which adds to the cost of the final product. For best results, the colloidal titania sols should be substantially free of aggregates having a maximum particle size greater than 150 millimicrons.

A relatively uncomplicated and preferred method for the preparation of a stable acidic dispersion of colloidal titania having a low ion content was developed for use in the following invention. The method employed consists of hydrolysis of an acidified alkyl orthoester of titanic acid (hereinafter referred to as an alkyl titanate) in a water or water-alcohol medium. Specifically, the method comprises (1) preparation of a premix of (a) an alkyl titanate, (b) a sufficient amount of an acid to produce a final pH of 1.0 to 3.0 in said colloidal dispersion and (c) a water miscible alcohol; (2) producing said colloidal dispersion by adding to the premix an amount of water which is sufficient to effect complete hydrolysis of the alkyl titanate; and (3) dispersing the resulting colloidal dispersion until it is homogeneous, said colloidal dispersion containing 0.1 to 10 weight percent titania, said titania consisting essentially of somewhat monodispersed particles falling in the range of 5 to 150 millimicrons in diameter.

To obtain complete hydrolysis of the titanate and to prevent gellation of the sol during preparation, the pH of the final sol must be maintained at 1.0 to 3.0, preferably 2.0. Suitable acids include both organic and inorganic acids such as acetic, hydrochloric, nitric, toluenesulfonic, and propanoic. The specific acid utilized has a direct effect on the rate of silanol condensation and this in turn determines shelf life of the coating composition itself. Thus selection of an acid for use in adjusting the pH of the sols must be made with the properties of the final coating composition in mind. Titania sols generally tend to be stable at lower pH values than are the silica sols. Silica sols are commercially available as both acidic and basic hydrosols. The stronger acids, such as hydrochloric and toluenesulfonic acid, give appreciably shortened room temperature shelf life to the coating composition and require less aging to obtain the described partial condensate. Thus it is desirable to use the same acid in both the silica sol and the titania sol to give a consistent shelf life to the final coating composition. It is preferable to add a sufficient amount of a water-miscible carboxylic acid such as acetic or propanoic acid to provide a pH of 2.0 in the titania sol.

The alkyl titanates useful in preparing the titania sol are the alkyl orthoesters of titanic acid of the formula $Ti(OR^1)_4$ where $R^1$ is an alkyl group containing 2 to 6 inclusive carbon atoms such as tetraethyl titanate, tetraisopropyl titanate, tetrapropyl titanate, tetrabutyl titanate, tetraisobutyl titanate, and tetrahexyl titanate. Other titanates useful in the preparation of the titania sol are partially hydrolyzed alkyl titanates which have condensed to give a product of the average formula $(R^1O)_{2x+2}Ti_xO_{x-1}$ where $R^1$ is an alkyl radical of 2 to 6 inclusive carbon atoms and x is some positive integer greater than 1, the actual value of x being dependent upon the amount of acid and water present when the hydrolysis and condensation took place. One such compound is described as a "polymerized $C_4$ alkyl titanate" and is commercially available under the tradename of "TYZOR PB" from E. I. duPont de Nemours & Company, Wilmington, Del. Isopropanol solvent is preferred for the coating composition because it promotes adhesion to the substrate, therefore the use of tetraisopropyl titanate is preferred since hydrolysis of that titanate generates the desired solvent. The amount of titanate added initially is that amount necessary to provide from 0.1 to 10 weight percent titania in the sol, preferably that amount necessary to provide from 4-6 weight percent titania.

The amount of water required is at least that amount necessary to effect complete hydrolysis of all the ester linkages or 2 moles of water per mole of titanate. Generally, the amount of water added ranged between 20 and 160 moles of water per mole of alkyl titanate, preferably between 20 and 80 moles of water per mole of alkyl titanate. In any event, the titanate must be completely hydrolyzed and substantially in particulate form prior to the addition of the alkyltrialkoxysilanes.

The alcohol resulting from the hydrolysis of the titanate will be present in the sol. In the case of tetraisopropyl titanate acidified with acetic acid, a sol can be produced which is stable without addition of any further alcohol. Addition of further amounts of alcohol may increase or decrease the stability of the sol. When hydrochloric acid or nitric acid is used, addition of extra isopropanol increases sol stability. Examples 1 and 2 infra, demonstrate this observation.

Any water-miscible alcohol, or mixture of several alcohols, especially where one is not in itself miscible with water, can be used to stabilize the sol. Examples of some useful alcohols are methanol, ethanol, n-propanol, isopropanol, n-butanol, isobutanol, t-butanol, ether alcohols such as ethylene glycol monomethyl ether, ethylene glycol monoethyl ether, ethylene glycol monobutyl ether, propylene glycol monomethyl ether and the like. Isopropanol is the preferred alcohol.

The titania sol which is formed exhibits the Tyndall Effect, i.e., a white light entering the sol is scattered by the particles and appears blue. The color of the scattered light is dependent upon the particle size of the particles in the dispersion. Exhibition of the Tyndall Effect indicates that the colloidal particles are rather monodispersed and have a particle size in the range of one-tenth to one-twentieth the wavelength of visible light (380–780 millimicrons). Electron photomicrographs of the titania sol demonstrate that colloidal particles are formed. Electron diffraction studies of the titania sol demonstrate that the particles are essentially anatase titanium dioxide.

Once the silica and titania sols have been prepared, there are several methods available to produce the coating composition. One method consists of adding a partial condensate treated titania sol to a composition prepared by adding at least one trialkoxysilane, such as $RSi(OCH_3)_3$, to a silica sol and adjusting the pH to 2.0 to 6.0, preferably to a pH of 3.0–5.5, with the acid selected. The acid can be added to either the silane or the sol prior to mixing the two components provided that the mixing is done rapidly. The amount of acid necessary to obtain the desired pH will depend on the alkali metal content of the silica, but is usually less than one percent by weight of the composition. For the purposes of the present invention, it is preferred that the silica sol be cooled below room temperature prior to the addition of the trialkoxysilane.

Alcohol will be generated by the hydrolysis of the trialkoxysilane and will become part of the solvent mixture. Additional water or water-miscible alcohols may be added to produce a coating composition with the desired viscosity and non-volatile solids content. The well-mixed solution should then be aged for a short period of time to ensure formation of the partial condensate. The coating composition containing colloidal silica thus obtained is a clear or slightly hazy, low viscosity fluid. the condensation of SiOH continues at a very slow rate and the composition will eventually form gel structures. The bath life of the composition can be extended by maintaining the dispersion at or below room temperature, for example at 40° F.

The coating composition consists of colloidal silica and colloidal titania dispersed in a solution of the siloxanol in a water-alcohol cosolvent. The same types of alcohols, or mixtures thereof, which have been detailed previously for use in the sols, are also suitable for use in the coating compositions. The solvent system should contain from about 20 to 75 weight percent alcohol to insure solubility of the siloxanol. Optionally, additional amounts of water-miscible polar solvents, such as acetone, tetrahydrofuran and the like may be added, preferably, as no more than 60 weight percent of the total weight of the cosolvent system. Isopropanol is the preferred alcohol and when mixtures of alcohols are utilized, it is preferred that at least 50 weight percent of isopropanol, based upon the total weight of alcohol present, be used in the mixture to obtain optimum adhesion to the substrate.

We have also discovered that polar solvents which are only slightly water-miscible, such as ethylene glycol monoethyl ether acetate, ethylene glycol dimethyl ether and the like can also be used as a substantial portion of the cosolvent. The procedure for incorporating these solvents into coating compositions of the present invention involves vacuum stripping some of the water and the alcohol produced by hydrolysis during the formation of the silsesquioxane and adding the desired amount of slightly water-miscible solvent. Vacuum stripping does not ordinarily remove all of the alcohol present, thus a sufficient amount is usually present to render the slightly miscible solvent compatible with the coating composition. Other alcohols, such as n-butanol can be added with the above solvents to obtain compositions containing the desired ratio of solvents in the solvent system.

The proportions of colloidal titania, colloidal silica and trialkoxy silane are adjusted so that a subsequent mixture of the two solutions will give a coating composition with the desired final proportions.

The preferred method for producing the coating composition is to add a quantity of trialkoxysilane to the acidic titania sol, which amounts to slightly more than that amount necessary to completely coat the titania particles. The addition of the trialkoxysilane can be made at room temperature or below. This partial condensate treated titania sol is then added to the coating composition produced in the Clark patent to produce a coating composition with the desired proportions of colloidal titania, colloidal silica and hydroxylated silsesquioxane. The pH may then be adjusted with acid and the final nonvolatile solids level of 5 to 50 weight percent may be reached by the addition of water and/or solvents.

A second method for preparation of the coating composition is to prepare a mixed sol by adding an acidified titanate directly to a colloidal sol of silica at room temperature and allowing the dispersion to clear. The colloidal particles of titania are formed in situ and the mixed sol is then treated in the same manner as outlined above to produce a coating composition.

Buffered latent condensation catalysts can be added to the composition so that milder curing conditions can be utilized and to maximize hardness and abrasion-resistance. Alkali metal salts of carboxylic acids, such as sodium acetate, are one class of such latent catalysts. The amine carboxylates and quaternary ammonium carboxylates are another such class of latent catalysts. Of course the catalysts must be soluble, or at least miscible, in the cosolvent system. The catalysts are latent to the extent that at room temperature they do not appreciably shorten the bath life of the composition. Buffered catalysts are used to avoid detrimental effects caused by variations in the pH of the composition.

Certain commercially available colloidal silica dispersions contain free alkali metal base which reacts with the organic acid during the adjustment of the pH to generate carboxylate catalysts in situ. This is particularly true when starting with a silica hydrosol having a pH of 8 or 9. The titania sols produced by hydrolysis of alkyl titanate are free of such alkali metals. The compositions can be catalyzed by addition of carboxylates such as dimethylamine acetate, ethanolamine acetate, dimethylaniline acetate, tetraethylammonium benzoate, sodium acetate, sodium propionate, or benzyltrimethylammonium acetate. The amount of catalyst can be varied depending upon the desired curing conditions, but at about 1.5 weight percent catalyst in the composition, the bath life is shortened and the transparency of the coating to visible light may be impaired. It is preferred to utilize from about 0.05 to 1 weight percent of the catalyst.

To obtain liquid coating compositions which will produce a cured coating with optimum ultraviolet light absorbance and corrosion resistance, it is preferred to utilize a coating composition having a pH in the range of 3.0–5.5 which contains 15–35 weight percent solids; the silica portion having a particle size in the range of 5–30 millimicrons; the titania portion consisting of 1–10 weight percent of the solids, such titania having a particle size in the range of 5–40 millimicrons in diameter, the titania portion having been added as an acidic dispersion in a partial condensate of at least one trisilanol to an acidic dispersion of silica in the partial condensate of at least one trisilanol; the partial condensate being $CH_3Si(OH)_3$ present in an amount in the range of 50 to 70 weight percent of the total solids in a cosolvent of methanol, isopropanol and water, the alcohols representing from 40 to 60 weight percent of the cosolvent and a catalyst selected from the group consisting of sodium acetate and benzyltrimethylammonium acetate being present in an amount in the range of 0.05 to 1.0 weight percent of the composition. Such a composition is reasonably stable, having a shelf life of approximately one week at room temperature.

When coated onto a substrate, the composition can be cured in a relatively short time at temperatures in the range of 75°–125° C. to provide a hard, abrasion- and corrosion-resistant film which transmits visible light, but absorbs ultraviolet light and reduces degradation of the surface of the substrate.

The coating compositions of the invention can be applied to solid substrates by conventional methods, such as flowing, spraying or dipping, to form a continuous surface film. These compositions can be applied to solid substrates, such as wood, non-ferrous metals, printed surfaces, leather, glass, ceramics and textiles. The compositions are especially useful as coatings for dimensionally stable synthetic organic polymeric substrates in sheet or film form, such as acrylic polymers, for example, poly(methylmethacrylate), polyesters, for example, poly(ethyleneterephthalate) and polycarbonates, such as poly(diphenylolpropane)carbonate and poly(diethylene glycol bis-allyl) carbonate, polyamides, polyimides, copolymers of acrylonitrile-styrene, styrene, styreneacrylonitrilebutadiene copolymers, polyvinyl chloride, butyrates, polyethylene and the like. Transparent polymeric materials coated with these compositions are useful as flat or curved enclosures, such as windows, skylights and windshields, especially for transportation equipment and exterior glazing applications. Plastic lenses, such as acrylic or polycarbonate opthalmic lenses, can also be coated with the compositions of the invention. In certain applications requiring high optical resolution, it may be desirable to filter the coating composition prior to applying it to the substrate.

Cured coatings of the present invention applied to aluminum render the surface more resistant to corrosion by acid than do compositions containing silica alone.

Aluminum articles coated with the cured coatings of the present invention are useful where resistance to corrosion by acids is important such as aluminum beer cans and containers for food.

A hard, solvent-resistant surface coating is obtained by removal of the solvent and volatile materials. While the composition will air-dry to a tack-free condition, heating in the range of 50° to 150° C. is necessary to effect condensation of the residual silanols in the partial condensate. This final cure results in the formation of silsesquioxane of the formula $RSiO_{3/2}$ and greatly enhances the abrasion resistance of the coating.

Cure times for the composition will vary according to the nature of the solvent system and the type of substrate employed. For example, a cure time of six hours at 110° C. was employed for aluminum, glass, and poly(diphenylol propane)carbonate substrates while six hours at 80° C. was used for poly(methylmethacrylate) due to the lower softening temperature of this plastic substrate. The coating thickness can be varied by means of the particular application technique, but coatings of about 0.5 to 20 microns, preferably from 2 to 10 microns, are generally used. Multiple coatings can be utilized although this may tend to decrease the hardness and abrasion resistance of the final coating. All percentages expressed in the following examples are by weight unless otherwise stated.

The following test methods were used to evaluate the cured coatings:

A. The hardness of the coating was determined using the pencil test outlined in ASTM D-3363-74.

B. Adhesion was measured by the tape test outlined in Method B, ASTM D-3359-76.

C. Abrasion resistance of the coating was determined by the test outlined in ASTM D-1044-76. The test consisted of 500 cycles with a Calibrase CS-10F wheel with a 430 gram load on each arm. The loss in light transmission due to abrasion was measured using a hazemeter of the type noted in ASTM D-1044-76, except that the impinging light beam was 18 millimeters in diameter, and was reported as a percentage change in haze (% Δ Haze).

D. Pencil Eraser Test: This test is meant to be a quick qualitative method of determining scratch resistance of a coating. The test is carried out by rubbing an ordinary pencil eraser against the coating ten times and evaluating the extent of scratching as: very slightly abraded (VSA), slightly abraded (SA) or abraded (A).

E. Corrosion Test: This test was performed on metal substrates. A solution of 10 parts by weight concentrated hydrochloric acid, 20 parts by weight of copper (II) sulfate pentahydrate and 70 parts by weight water was prepared. Metal panels coated on both sides were dipped into the above solution for five minutes and were then examined for signs of corrosion. If no corrosion was observed, then the same panel was scribed to the bare metal with a razor blade and again dipped into the above solution for five minutes. It was then removed and examined for signs of corrosion at the scribe. The extent of corrosion was evaluated as: No corrosion (NC) or badly corroded (BC) for the unscribed panels and as no corrosion in the vicinity of the scribe (NCV), little corrosion in the vicinity of the scribe (LCV) or corroded in the vicinity of the scribe (CV).

F. Ultraviolet Absorbance Test: This test was run by curing a coating on a quartz crystal and measuring the UV absorbance of the coating at 284.4 millimicrons. To normalize the absorbance figures, the absorbance multiplied by 100 was divided by the total weight percent solids in the film:

$$\frac{UV \text{ Absorbance at } 284.4 \text{ m}\mu \times 100}{\% \text{ solids}} = \text{Normalized Absorbance Value Reported}$$

The following examples are merely illustrative and are not to be considered as limiting the invention, which is properly delineated in the following claims.

EXAMPLE 1

A colloidal dispersion or sol of titania was prepared by adding 12 grams of glacial acetic acid to 6 grams of tetraisopropyl titanate. Ten grams of water was added to the acidified titanate while stirring. Stirring was continued until the sol was homogeneous. The resulting clear sol had a pH value of 2.0 and contained approximately 6% colloidal titania. Electron microscopy showed that the sol consisted essentially of monodispersed particles falling in the range of 15 to 31 millimicrons in diameter. Electron diffraction studies showed that the particles were composed of anatase titanium dioxide. This sol was stable for approximately two weeks at room temperature.

EXAMPLE 2

Another titania sol demonstrating the use of hydrochloric acid and isopropanol was prepared. A dilute solution of hydrochloric acid was prepared by adding 1 gram of concentrated hydrochloric acid (37% HCl) to 5 grams of water. Five grams of isopropanol was added to 2 grams of tetraisopropyl titanate and this mixture was slowly added to 6 grams of the dilute hydrochloric acid solution with stirring. Large gel particles formed initially upon addition of the titanate solution, but the solution became homogeneous and clear after agitation on a shaker for one hour. The homogeneous sol exhibited the Tyndall Effect, i.e., the scattered light was blue, contained approximately 4.7% titania and had a pH of 2.0.

EXAMPLE 3

A coating composition embodying the present invention was prepared in the following manner: first, a pigment-free coating composition was prepared by the following method. Methyltrimethoxysilane containing 5 weight percent glacial acetic acid was mixed with an aqueous colloidal silica dispersion, such dispersion containing 34% $SiO_2$ of approximately 15 millimicron particle size and having a $Na_2O$ content of less than 0.01 weight percent, at a weight ratio of 1.0 methyltrimethoxysilane to 0.5 colloidal silica solids. The mixture was cooled and maintained below 10° C. during the mixing and then allowed to rise to room temperature. The mixture was then stripped under vacuum with a distillation pot temperature of 35°–40° C. to about 50% nonvolatile content and then rediluted to about 35% nonvolatile content with a 50:50 mixture of isopropanol/butanol. 1.5 weight percent acetic acid and 0.09 weight percent of sodium acetate based on total weight of solution was added. The resulting composition had a pH of 4.7 and is hereinafter referred to as Composition C. In another beaker, 0.4 grams of methyltrimethoxysilane was slowly stirred into 2.0 grams of the titania sol produced in Example 1, both of which were at room temperature. This solution gradually cleared as the silane formed a partial condensate. To this solution was added 6.0 grams of Composition C and 0.1 grams of a catalyst solution prepared by adding 10 grams of sodium acetate to 100 grams of a 1:1 solution of water:isopropanol. The resulting clear coating composition had a pH of 3.9 and contained 29% solids. Such solids consisted of 5% colloidal titania, 43.3% colloidal silica and 51.7% of a partial condensate of monomethyl trisilanol.

EXAMPLES 4-7

The following examples of coatings compositions with varying amounts of colloidal titania were prepared in the same manner as detailed in Example 3. Examples 3, 4, and 5 fall within the scope of the present invention and Examples 6 and 7 fall outside the scope of the present claims and are used for comparative purposes.

TABLE I

| Example No. | Titania Sol Of Example 1 | Methyl Trimethoxy Silane | Composition C | Catalyst Solution | % Solids |
|---|---|---|---|---|---|
| (4) | 2.0 g. | 1.0 g. | 4.0 g. | 0.1 g. | 29 |
| (5) | 2.0 g. | 0.4 g. | 4.0 g. | 0.1 g. | 27 |
| (6) | 2.0 g. | 0.4 g. | 2.0 g. | 0.1 g. | 23 |
| (7) | (a) | 0.4 g. | 4.0 g. | 0.1 g. | 25 |

(a) Control Sample: 2.0 grams of 1:1 glacial acetic acid:water solution (comparative example).

EXAMPLE 8

Films were cast from the coating compositions prepared in Examples 3-7 by flow-coating the composition onto flat panels of each substrate at room temperature and suspending the panels vertically for 20-30 minutes to allow the coating to air dry. The panels used were 4"×1"×1/16" glass, 4"×4"×⅛" biaxially-oriented, stretched panels of poly(methylmethacrylate) (commercially available under the trademark "Lucite") and 4"×4"×⅛" panels of poly(diphenylol propane)carbonate (commercially available under the trademark "Lexan"). Surface preparation of the plastic panels was as follows: the release paper was removed, the panels were cleaned with a soft cloth soaked with water and then washed with isopropanol. After a final rinse with isopropanol, the panels were dried in a current of warm air. The polycarbonate panels were additionally baked for one hour at 110° C. to remove stresses in the plastic. The coated glass and polycarbonate panels were then baked for six hours at 110° C. and the acrylic panels were baked for 6 hours at 80° C. The following table lists the properties of the cured coatings:

TABLE II

| Coating Composition | Cured Film[a] % TiO$_2$ | Cured Film[a] % SiO$_2$ | Pencil Hardness[b] | Pencil Eraser Test[b] |
|---|---|---|---|---|
| Ex. 3 | 5 | 43 | 8-9H | SA |
| Ex. 4 | 6 | 34 | 8-9H | SA |
| Ex. 5 | 7 | 41 | 8-9H | SA |
| Ex. 6[c] | 12 | 34 | 6H | A |
| Ex. 7[c] | 0 | 44 | 9H | VSA |

[a] The solids present in the cured film is calculated on the basis of a matrix of silsesquioxane of the formula RSiO$_{3/2}$.
[b] Substrate: glass.
Abbreviations:
A - Abraded
SA - Slight Abrasion
VSA - Very Slight Abrasion
[c] Comparative example.

Adhesion tests conducted on the unprimed poly(methyl methacrylate) and primed polycarbonate substrates indicated excellent adhesion, almost all of the panels having 100% adhesion. The film thickness of the cured coatings was 2-3 microns. These examples demonstrate that hard, relatively abrasion resistant coatings for plastic substrates are produced by the coating compositions of the present invention.

EXAMPLE 9

A pigment-free coating composition was prepared as outlined in Example 3. However, for this example, the initial addition of acetic acid was omitted, resulting in a coating composition with a pH of approximately 3. In another beaker, 0.4 grams of methyltrimethoxysilane was slowly stirred into 2 grams of the hydrochloric acid-containing sol prepared in Example 2, both of which were at room temperature. After stirring for a short time, this solution was slowly added into 4 grams of the pigment-free coating composition prepared above. Then 0.3 grams of the sodium acetate catalyst solution prepared in Example 3 was added. The resulting coating composition had a hazy appearance, a pH of approximately 3 and contained 25.6% solids, of which 7% was colloidal titania and 40.8% was colloidal silica. This coating composition was coated on a glass panel and baked 6 hours at 110° C. A hazy, opaque coating with a pencil hardness of approximately 6H resulted. Such an opaque coating would find utility on substrates such as aluminum where transparency is not required.

EXAMPLE 10

A coating composition illustrating the use of ethylene glycol monoethylether acetate was prepared as follows. A pigment-free coating composition was prepared by slowly adding with stirring, 71.3 grams of methyltrimethoxysilane into a mixture of 3.5 grams of glacial acetic acid and 103 grams of an aqueous colloidal silica dispersion which had been cooled to 5° C. wherein the silica dispersion contained 34% SiO$_2$ of approximately 15 millimicron particle size and had an Na$_2$O content of less than 0.01 weight percent. This composition was allowed to stand at room temperature for 20 minutes. Then the composition was vacuum-stripped at 40 millimeters of mercury pressure at 25°-30° C. until 44 grams of distillate was removed from an initial total of 177.8 grams of coating composition. To the remaining composition was added 66 grams of ethylene glycol monoethylether acetate to reduce the composition to 35% solids. The solvent medium consisted of approximately 50% ethylene glycol monoethylether acetate, 30% water and 20% methanol. 2 grams of a 5% colloidal titania sol was treated with 0.5 grams of methyltrimethoxysilane as in Example 3 and this was added to 6 grams of the above coating composition. The composition was coated on glass and aluminum panels and baked 6 hours at 110° C. The resulting coating was transparent, had a pencil hardness of 7H and a pencil eraser abrasion rating of Very Slightly Abraded.

EXAMPLE 11

To demonstrate the improved resistance to ultraviolet light (UV) degradation of plastic substrates, especially polycarbonate substrates, offered by the coatings of this invention over coatings containing only colloidal silica, the UV absorbance at 284.4 millimicrons was measured. Compositions with various levels of colloidal titania were prepared and cured on quartz crystal substrates instead of plastic and glass as detailed in Example 3. The UV absorbance was then measured and the results obtained are tabulated below:

TABLE III

| Sample | % TiO$_2$ In Solids | % Solids | pH Of Coating Composition | Normalized UV Absorbance |
|---|---|---|---|---|
| A | 0[1] | 25 | 5.2 | 6 |
| B | 2 | 31 | 4.1 | 177 |
| C | 4 | 29 | 3.7 | 317 |
| D | 5 | 28 | 3.9 | 393 |
| E | 6 | 27 | 3.5 | 407 |
| F | 10 | 23 | 3.3 | 726 |

[1]Control, contains same ingredients as the rest except for colloidal titania (Comparative example).

From this data, it would be expected that as the level of colloidal titania is increased, the plastic substrate would receive increasing protection from harmful wavelengths of UV radiation.

EXAMPLE 12

Evaluation of the weatherability and resistance of the coatings to loss of adhesion due to degradation at the coating-substrate interface was accomplished by exposing the coated panels in an Atlas Weather-O-Meter ® per ASTM-D-822. A carbon arc light source was used with glass filters having a UV cutoff of 2550 A. A two hour cycle consisting of 102 minutes of light without water spray and 18 minutes of darkness with a water spray aimed at the back of the panels was used. The total number of hours the duplicate panels were exposed was reported. The weatherability of the coatings was measured by the tape test for adhesion of Method B, ASTM-D-3359. The adhesion test was done on the sides of the panel nearest the edge.

The coating compositions prepared in Example 11 and, for comparative purposes, a control and a sample of Composition C were used in the experiment. Primed polycarbonate panels of the same type used in Example 8 were used. After cleaning the panels, a primer solution was wiped onto the panels which were then dried in a 100° C. oven for 2 minutes. The panels were cooled to room temperature, coated and cured as in Example 8. The primer solution was prepared by adding 0.1 gram of water to 2 grams of 3-aminopropyltriethyoxysilane. This was then added to 188 grams of a 2:1 by weight solution of isopropanol/n-butanol to form a primer solution.

The abrasion resistance of the coated panel was also measured and is reported in Table IV while the accelerated weathering data is reported in Table V. Duplicate samples of each composition were tested.

TABLE IV

| Samples | % TiO$_2$ In Solids | % Solids | pH Of Coating Composition | Abrasion Resistance % Haze |
|---|---|---|---|---|
| A | 0[1] | 25 | 5.2 | 1.8 |
| B | 2 | 31 | 4.1 | 5.8 |
| C | 4 | 29 | 3.7 | 3.4 |
| D | 5 | 28 | 3.9 | 4.5 |
| E | 6 | 27 | 3.5 | 3.4 |
| F | 10 | 23 | 3.3 | 4.2 |
| Composition C | 0 | 35 | 4.7 | 1.0 |

[1]Control, contains the same ingredients as the rest except for colloidal titania (Comparative example).

TABLE V

| Sample | % TiO$_2$[1] | TOTAL EXPOSURE TIME IN HOURS[2] | | | | | Yellowness Index[b] At 352 Hours |
|---|---|---|---|---|---|---|---|
| | | 70 | 190 | 211 | 236 | 352 | |
| A-1 | 0 | 50 | 10 | 0[3] | — | — | — |
| A-2 | 0 | 100 | 20 | 0[3] | — | — | — |
| B-1 | 2 | 100 | 50 | 70 | 0-10 | 0 | 3.86 |
| B-2 | 2 | 100 | 0 | 0 | — | — | — |
| C-1 | 4 | 100 | 100 | 100 | 70 | 15 | 1.89 |
| C-2 | 4 | 100 | 50 | 100 | 80 | 0 | 2.63 |
| D-1 | 5 | 100 | 100 | 100 | 50 | 0 | 1.36 |
| D-2 | 5 | 100 | 100 | 0 | — | 0 | — |
| E-1 | 6 | 100 | 100 | 100 | 99 | 95 | 1.18 |
| E-2 | 6 | 100 | 25 | 100 | 10 | 80 | 1.50 |
| F-1 | 10 | 95 | 90 | 0 | — | — | — |
| F-2 | 10 | 90 | 0 | 0 | — | — | — |
| Comp. C-1 | 0 | 100 | 100 | 0[3] | — | 0[3] | 4.34 |
| Comp. C-2 | 0 | 100 | 0 | 0[3] | — | 0[3] | 4.18 |
| Unexposed, Uncoated Panel | — | — | — | — | — | — | 0.86 |

(—) Indicates not evaluated.
[1]Weight percent of total solids.
[2]Values reported are percentage of coating left on the panel after performing the tape adhesion test.
[3]These panels appeared to be yellowed to the naked eye.

The above weathering data indicate that compositions of the present invention are useful in reducing the degradative effects of ultraviolet light on coated polycarbonate panels, especially when 6% colloidal titania is present in the cured coating. It should be noted that the control and Composition C panels appeared yellowed to the naked eye after 211 hours while the panels containing colloidal titania did not. After 352 hours, the panel containing 2% colloidal titania begin to show an amount of yellowing similar to the Composition C panels. However, the panels containing 4-6% colloidal titania showed very little, if any, yellowing when compared to the yellowness index value of the unexposed panels. The yellowness index, b, is represented by the equation $$b = \frac{7.0 (Y - 0.847 Z)}{\sqrt{Y}}$$

where Y and Z are the CIE trismulus values obtained on a Hunterlab D25D Sphere Haze and Color Difference Meter with Yellowness Index Option (Hunter Associates Laboratory, Fairfax, Va.). The value of b was automatically computed by the machine, see ASTM-D-1925. The higher the value of b, the greater the degree of yellowness. It is possible that the primer coating may also be contributing to the yellowness of the panel since it contains an amino group. However, the primer is beneath the coating film and the data above indicates that coatings with levels of colloidal titania higher than 4% do indeed screen the surface below the film, thereby reducing the effects of ultraviolet light.

EXAMPLE 13

To demonstrate the improvement in corrosion resistance which the coating compositions of the present invention offer over compositions containing silica alone, the compositions in Examples 3–7 were subjected to the hydrochloric acid corrosion test. 4"×1"×0.025" aluminum panels were cleaned with an aqueous alkaline metal cleaner (Oakite Aluminum Cleaner 166, commercially available from Oakite Products, Inc. Derkeley Heights, N.J.), coated with the compositions of Examples 3–7, air dried for 20–30 minutes and baked for 6 hours at 110° C. The details of the test have been outlined earlier. The results are tabulated below:

TABLE VI

| | HCl Acid Corrosion | | |
|---|---|---|---|
| Example | Unscribed | Scribed | % TiO$_2$ In Cured Coating |
| (3) | NC | NCV | 5 |
| (4) | NC | NCV | 6 |
| (5) | SC | CV | 7 |
| (6) | C | CV | 12 (Comparative example) |
| (7) | NC | LCV | 0 (Control, comparative example) |

Abbreviations:
Unscribed Panels -
C - Corroded
NC - Not Corroded
SC - Slightly Corroded
Scribed Panels -
CV - Corroded In Vicinity Of Scribe
LCV - Little Corrosion In Vicinity Of Scribe
NCV - Not Corroded In Vicinity Of Scribe

EXAMPLE 14

To demonstrate the effect of catalyst and solids content on the abrasion resistance of the cured coatings, a basic composition containing 4.2% collodial titania was prepared as in Example 3 using 2 grams of a titania sol containing acetic acid and 5% colloidal titania, 0.4 grams of methyltrimethoxy silane and 6 grams of Composition C. Various parts of 10% sodium acetate catalyst solution were added and the compositions were coated and cured on primed polycarbonate panels as detailed in Example 12. The abrasion resistance of the panels and weight percent of solid catalyst based on the total weight of the coating composition is recorded in Table VII.

To evaluate the effect of reducing the solids content, the basic composition was reduced to 20% solids using a 2:1 by weight solution of ethylene glycol monobutyl ether:isopropanol. Various parts of catalyst solution were added to these compositions and they were cured as above. The data seems to indicate that the solids content has an effect on the abrasion resistance and that higher solids would be preferable if the application viscosity at higher solids is acceptable.

TABLE VII

| Example | % TiO$_2$[1] | % Solids | pH | % Sodium Acetate[2] | Abrasion Resistance (% Δ Haze) |
|---|---|---|---|---|---|
| A | 4.2 | 28.6 | 3.0 | 0.06 | 6.9 |
| B | 4.2 | 28.2 | 3.1 | 0.18 | 7.0 |
| C | 4.2 | 27.9 | 3.2 | 0.30 | 3.4 |
| D | 4.2 | 27.6 | 3.3 | 0.40 | 2.2 |
| E | 4.2 | 27.2 | 3.4 | 0.51 | 2.0 |
| F | 4.2 | 27.0 | 3.5 | 0.62 | 1.5 |
| G | 4.1 | 20.1 | — | 0.29 | 2.8 |
| H | 4.1 | 20.0 | — | 0.37 | 4.6 |
| I | 4.1 | 20.1 | — | 0.45 | 4.0 |
| J | 4.1 | 20.0 | — | 0.53 | 3.1 |
| K | 4.0 | 20.0 | — | 0.68 | 3.1 |

[1] % of solids
[2] % of total composition

EXAMPLE 15

To demonstrate the use of small amounts of other types of reactive silanes in the present invention, compositions were prepared and cured on polycarbonate panels in the same manner as that used in Example 14. However, instead of adding 0.4 grams of methyltrimethoxysilane to the TiO$_2$ sol, 0.4 grams of gamma-glycidoxypropyltrimethoxysilane (Sample A) and 0.4 grams of gammamercaptopropyltrimethoxysilane (Sample B) were substituted. The adhesion of the coating, pencil eraser abrasion and abrasion resistance of the coatings were obtained and are summarized in Table VIII. The cured coatings were colorless, transparent and contained a few small gel particles.

TABLE VIII

| Sample | % TiO$_2$ | Silsesquioxane % CH$_3$SiO$_{3/2}$ | % Other | Adhesion | Pencil Eraser | Abrasion Resistance (% Δ Haze) |
|---|---|---|---|---|---|---|
| A | 4.2 | 79 | 21 | 100% | VSA | 1.4 |
| B | 4.2 | 80 | 20 | 99% | VSA | 2.4 |

Reasonable modification and variation are within the scope of this invention which is directed to novel improved pigment-free coating compositions and solid surfaces coated with such materials.

That which is claimed is:

1. A composition of matter comprising a dispersion of colloidal silica and colloidal titania, said colloidal particles having a particle size falling in the range of 5 to 150 millimicrons, in a water-alcohol solution of the partial condensate of a silanol having the formula RSi(OH)$_3$ in which R is selected from the group consisting of alkyl radicals of 1 to 3 inclusive carbon atoms, the gamma-chloropropyl radical, the vinyl radical, the 3,3,3-trifluoropropyl radical, the gammaglycidoxypropyl radical, the gammamethacryloxypropyl radical, the gammamercaptopropyl radical and the phenyl radical, at least 70 weight percent of the silanol being CH$_3$Si(OH)$_3$, said composition containing 5 to 50 weight percent solids, said solids consisting essentially of 1 to 10 weight percent of said colloidal titania, 20 to 56 weight percent colloidal silica and 34 to 79 weight percent of said partial condensate, said composition containing sufficient acid to provide a pH in the range of 2.0 to 6.0.

2. A composition in accordance with claim 1 in which the alcohol in the water-alcohol cosolvent is in the range of 20 to 75 weight percent based on the total weight of the cosolvent.

3. A composition in accordance with claim 1 in which the partial condensate is of CH$_3$Si(OH)$_3$.

4. A composition in accordance with claim 2 wherein at least 50 weight percent of the alcohol is isopropanol.

5. A composition in accordance with claim 1 wherein the alcohol-water cosolvent contains a water-miscible polar solvent in an amount up to 60 weight percent based on the total weight of the cosolvent.

6. A composition in accordance with claim 2 wherein the acid is acetic acid.

7. A composition in accordance with claim 6 containing from about 0.05 to 1.5 weight percent of a buffered latent silanol condensation catalyst.

8. A composition in accordance with claim 7 in which the catalyst is sodium acetate.

9. A composition in accordance with claim 2 wherein the colloidal titania is derived from the complete hydrolysis of a titanate selected from the group consisting of alkyl titanates of the formula $Ti(OR^1)_4$ and polymeric alkyl titanates of the formula $(R^1O)_{2X+2}Ti_XO_{X-1}$ where $R^1$ is an alkyl radical of 2 to 6 inclusive carbon atoms and X is a positive integer greater than 1.

10. A composition in accordance with claim 9 wherein the titanate utilized is tetraisopropyl titanate.

11. A composition in accordance with claim 5 wherein the partial condensate is of $CH_3Si(OH)_3$.

12. A composition in accordance with claim 8 wherein the partial condensate is of $CH_3Si(OH)_3$.

13. A composition in accordance with claim 1 wherein said partial condensate is present in an amount in the range of 50 to 70 weight percent of a total solids and said colloidal titania is present in an amount in the range of 4 to 6% by weight of the total solids.

14. A composition in accordance with claim 1 wherein the colloidal titania was incorporated by mixing an acidic dispersion of colloidal titania and partial condensate in a water-alcohol solution with an acidic dispersion of colloidal silica and partial condensate in an alcohol-water solution.

15. A composition in accordance with claim 14 wherein the partial condensate is of $CH_3Si(OH)_3$.

16. A cured coating comprising:
    a. from 1 to 10 weight percent colloidal titania, the particle size of said colloidal titania falling in the range of 5 to 150 millimicrons in diameter, and
    b. from 20 to 56 weight percent colloidal silica, the particle size of said colloidal silica falling in the range of 5 to 150 millimicrons in diameter, in a matrix of
    c. a silsesquioxane of the formula $RSiO_{3/2}$ in which R is selected from the group consisting of alkyl radicals of 1 to 3 inclusive carbon atoms, the gamma-chloropropyl radical, the vinyl radical, the 3,3,3-trifluoropropyl radical, the gammaglycidoxypropyl radical, the gammamethacryloxypropyl radical, the gammamercaptopropyl radical, and the phenyl radical, at least 70 weight percent of such silsesquioxane being $CH_3SiO_{3/2}$, said matrix comprising 34 to 79 weight percent of the cured coating.

17. A article comprising a solid substrate coated with the composition of claim 1 or 16.

18. An article comprising a solid substrate coated with the composition of claim 3.

19. An article comprising a solid substrate coated with the composition of claim 1 and then cured.

20. An article comprising a solid substrate coated with the composition of claim 7 and then cured.

21. A coated article in accordance with claim 20 wherein said solid substrate is transparent.

22. A coated article in accordance with claim 20 wherein said solid substrate is an acrylic polymer.

23. A coated article in accordance with claim 20 wherein said solid substrate is a polyester.

24. A coated article in accordance with claim 20 wherein the polyester is poly(diphenylolpropane)carbonate.

25. A coated article in accordance with claim 20 wherein the polyester is poly(diethylene glycol bisallyl)carbonate.

26. A coated article in accordance with claim 20 wherein said solid substrate is selected from a group consisting of aluminum, copper and brass.

27. A coated article in accordance with claim 20 wherein said metal is aluminum.

* * * * *

UNITED STATES PATENT AND TRADEMARK OFFICE
CERTIFICATE OF CORRECTION

PATENT NO. : 4,275,118
DATED : June 23, 1981
INVENTOR(S) : Ronald H. Baney and Frank K. Chi It is certified that error appears in the above—identified patent and that said Letters Patent is hereby corrected as shown below:

In column 11, line 25, the second column of Table I, the heading "Sol" should read --Sol of--.

In column 11, line 25, the third column of Table I, the heading "of" should read --Methyl--.

In column 11, line 25, the fourth column of Table I, the heading "Methyl" should read --Compo---.

In column 11, line 25, the fifth column of Table I, the heading "Compo-" should be deleted.

In column 14, line 47, the word "begin" should read --began--.

Signed and Sealed this

Twentieth Day of April 1982

[SEAL]

Attest:

GERALD J. MOSSINGHOFF

Attesting Officer     Commissioner of Patents and Trademarks